United States Patent
Cano-Iranzo et al.

(10) Patent No.: US 8,298,350 B2
(45) Date of Patent: Oct. 30, 2012

(54) CHROMIUM-FREE CONVERSION COATING

(75) Inventors: Francisco Jesus Cano-Iranzo, San Sebastian (ES); Uxoa Izagirre-Etxeberria, Zumaia Gipuzkoa (ES); Oihana Zubillaga-Alcorta, Gipuzkoa (ES); Patricia Santa Coloma-Mozo, Vitoria (ES); Nieves Lapeña-rey, Madrid (ES)

(73) Assignee: The Boeing Company, Chicago, IL (US)

( * ) Notice: Subject to any disclaimer, the term of this patent is extended or adjusted under 35 U.S.C. 154(b) by 362 days.

(21) Appl. No.: 12/442,104

(22) PCT Filed: Jul. 24, 2007

(86) PCT No.: PCT/US2007/016681
§ 371 (c)(1), (2), (4) Date: Apr. 7, 2009

(87) PCT Pub. No.: WO2008/094163
PCT Pub. Date: Aug. 7, 2008

(65) Prior Publication Data
US 2010/0009083 A1    Jan. 14, 2010

(30) Foreign Application Priority Data
Aug. 8, 2006 (EP) ................................. 06380228

(51) Int. Cl.
*C23C 22/34* (2006.01)
*H01B 1/12* (2006.01)
*C23C 22/00* (2006.01)

(52) U.S. Cl. ........ 148/274; 148/247; 148/283; 252/500; 252/518.1; 252/519.3; 252/519.33; 106/14.11; 106/14.15; 106/14.31; 106/14.37; 106/14.38; 106/14.44

(58) Field of Classification Search ............. 148/247, 148/274, 283; 252/500, 518.1, 519.3, 519.33; 106/14.11, 14.15, 14.31, 14.37, 14.38, 14.44
See application file for complete search history.

(56) References Cited

U.S. PATENT DOCUMENTS

| | | |
|---|---|---|
| 5,342,456 A | 8/1994 | Dolan |
| 5,928,795 A | 7/1999 | Spellane et al. |
| 5,980,723 A | 11/1999 | Runge-Marchese et al. |
| 6,113,709 A | 9/2000 | Jiang et al. |
| 6,150,032 A | 11/2000 | Yang et al. |
| 6,153,022 A | 11/2000 | Yoshida et al. |
| 6,190,780 B1 | 2/2001 | Shoji et al. |

(Continued)

FOREIGN PATENT DOCUMENTS

EP    0792922 A1    9/1997
(Continued)

OTHER PUBLICATIONS

Racicot, R.J., et al., "Corrosion Protection Comparison of a Chromate Conversion Coating to a Novel Conductive Polymer Coating on Aluminum Alloys," (1997) NACE International, Corrosion 97, Paper No. 531.

(Continued)

*Primary Examiner* — Lois Zheng

(57) ABSTRACT

A chromium-free conversion coating is prepared by the addition of inorganic salts to dispersions of conducting polymers which are then exposed to alloys of aluminum or other metals. Advantageously, the performance of the coating is comparable to that of known Cr (chromium)-based methods for a number of aluminum alloys having particular significance in the manufacture of aircraft.

18 Claims, 6 Drawing Sheets

U.S. PATENT DOCUMENTS

| | | |
|---|---|---|
| 6,328,874 B1 | 12/2001 | Kinlen et al. |
| 6,419,731 B2 | 7/2002 | Inbe et al. |
| 6,521,029 B1 | 2/2003 | Matzdorf et al. |
| 6,736,908 B2 | 5/2004 | Sako et al. |
| 6,758,916 B1 | 7/2004 | McCormick |
| 2004/0216637 A1* | 11/2004 | Buchheit et al. ............ 106/14.21 |
| 2007/0187001 A1* | 8/2007 | Kramer et al. ................ 148/247 |
| 2008/0305341 A1* | 12/2008 | Plieth et al. ................... 428/419 |

FOREIGN PATENT DOCUMENTS

| | | |
|---|---|---|
| GR | 990100423 A | 8/2001 |
| WO | WO 93/14166 A1 | 7/1993 |
| WO | WO 03/027203 A2 | 4/2003 |
| WO | WO 03/056062 A2 | 7/2003 |
| WO | WO 2005/061761 A1 | 7/2005 |
| WO | WO2006015756 * | 2/2006 |
| WO | WO 2008/094193 A2 | 8/2008 |
| WO | WO 2008/094193 A3 | 8/2008 |

OTHER PUBLICATIONS

Paloumpa, I., et al., "Mechanisms to inhibit corrosion of Al alloys by polymeric conversion coatings," Surface and Coatings Technology, 180-181 (2004) 308-312.

* cited by examiner

| Material Property | PANI | PEDOT | PPY |
|---|---|---|---|
| Polymer | Polyaniline | Polyethylenedioxythiophene | Polypyrrole |
| Solid Content | 6.0% | 1.2 – 1.4% | 6.0% |
| Dilution With | Water | Water | Water |
| pH | 2 – 3 | 1.5 – 2.5 | 3 or less |
| Conductivity (S/cm) | 1 – 2 Pressed Pellets | Up To 10 Cast Film | 0.01 – 0.001 Cast Film |
| Surface Resistivity (Ohm) | 10E4 | 10E6 | 10E4 – 10E6 |
| Viscosity | 18 Pas | 60 - 100 mPas | N.A. |
| Supplier | Panipol | Bayer | Eeonyx |
| Trade Name | Panipol W | Baytron P | Eeonomer 7000 |

FIG. 2

PEDOT / Zr

| Experiment | [PEDOT] (%) | [Zr] (g/L) * | pH ** |
|---|---|---|---|
| PEDOT 1 | 0.43 | 8 | 2 |
| PEDOT 2 | 0.86 | 5 | 3.5 |
| PEDOT 3 | 0.43 | 2 | 2 |
| PEDOT 4 | 1.30 | 2 | 2 |
| PEDOT 5 | 0.43 | 8 | 5 |
| PEDOT 6 | 1.30 | 2 | 5 |
| PEDOT 7 | 1.30 | 8 | 2 |
| PEDOT 8 | 0.86 | 5 | 3.5 |
| PEDOT 9 | 0.43 | 2 | 5 |
| PEDOT 10 | 0.86 | 5 | 3.5 |
| PEDOT 11 | 1.30 | 8 | 5 |
| PEDOT 12 | 0.43 | 5 | 3.5 |
| PEDOT 13 | 0.86 | 2 | 3.5 |
| PEDOT 14 | 0.86 | 5 | 2 |

Experimental Conditions for PEDOT / Zr

*[Zr] g/L = [$K_2ZrF_6$] g/L; ** pH Adjusted with $H_2ZrF_6$ and/or $NH_4OH$

FIG. 3

PPY / Zr

| Experiment | [PEDOT] (%) | [Zr] (g/L) * | pH ** |
|---|---|---|---|
| PPY 1 | 6 | 2 | 2 |
| PPY 2 | 2 | 8 | 2 |
| PPY 3 | 6 | 8 | 5 |
| PPY 4 | 2 | 2 | 2 |
| PPY 5 | 4 | 5 | 3.5 |
| PPY 6 | 4 | 5 | 3.5 |
| PPY 7 | 2 | 2 | 5 |
| PPY 8 | 4 | 5 | 3.5 |
| PPY 9 | 6 | 8 | 2 |
| PPY 10 | 2 | 2 | 5 |
| PPY 11 | 6 | 5 | 5 |
| PPY 12 | 2 | 5 | 3.5 |
| PPY 13 | 4 | 2 | 3.5 |
| PPY 14 | 4 | 5 | 2 |

Experimental Conditions for PPY / Zr

*[Zr] g/L = [$K_2ZrF_6$] g/L; ** pH Adjusted with $H_2ZrF_6$ and/or $NH_4OH$

*FIG. 4*

| EXPERIMENT | Corrosion Score ||
| --- | --- | --- |
| | 2024 T3 | 7075 T6 |
| PEDOT 1 | 3.0 | 3.0 |
| PEDOT 2 | 3.5 | 8.5 |
| PEDOT 3 | 1.0 | 3.5 |
| PEDOT 4 | 1.5 | 3.7 |
| PEDOT 5 | 4.0 | 9.0 |
| PEDOT 6 | 2.0 | 8.5 |
| PEDOT 7 | 2.0 | 3.5 |
| PEDOT 8 | 3.5 | 8.2 |
| PEDOT 9 | 3.5 | 9.0 |
| PEDOT 10 | 4.0 | 4.5 |
| PEDOT 11 | 8.0 | 2.7 |
| PEDOT 12 | 9.5 | 9.5 |
| PEDOT 13 | 2.5 | 5.5 |
| PEDOT 14 | 2.5 | 2.0 |
| ALODINE 1200S | 10 | 10 |

Experimental Results for PEDOT / Zr

*FIG. 5*

| EXPERIMENT | Corrosion Score | |
|---|---|---|
| | 2024 T3 | 7075 T6 |
| PPY 1 | 1.0 | 1.50 |
| PPY 2 | 1.0 | 1.75 |
| PPY 3 | 4.0 | 5.0 |
| PPY 4 | 1.0 | 1.75 |
| PPY 5 | 5.0 | 5.5 |
| PPY 6 | 4.0 | 5.5 |
| PPY 7 | 4.0 | 4.5 |
| PPY 8 | 4.0 | 5.25 |
| PPY 9 | 0.75 | 1.75 |
| PPY 10 | 4.75 | 8.0 |
| PPY 11 | 2.5 | 6.0 |
| PPY 12 | 4.0 | 5.0 |
| PPY 13 | 3.0 | 4.0 |
| PPY 14 | 0.5 | 1.5 |
| ALODINE 1200s | 10 | 10 |

Experimental Results for PPY / Zr

FIG. 6

CHROMIUM-FREE CONVERSION COATING

CROSS-REFERENCE TO RELATED APPLICATION

This application claims priority to International Application Number PCT/US2007/016681, filed Jul. 24, 2007, which is based on EP patent application number 06380228.4, filed Aug. 8, 2006, both of which are incorporated herein by reference.

FIELD OF THE DISCLOSURE

This invention relates generally to the field of coatings and corrosion control on metals, and in particular to a chromium-free conversion coating for aircraft applications.

BACKGROUND

Corrosion is defined as the chemical or electrochemical reaction between a material, usually a metal, and its environment that produces a deterioration of the material and its properties.

Corrosive attack begins on the surface of the metal. The corrosion process involves two chemical changes. The metal that is attacked or oxidized undergoes an anodic change, with the corrosive agent being reduced and undergoing a cathodic change. The tendency of most metals to corrode creates one of the major problems in the maintenance of aircraft, particularly in areas where adverse environmental or weather conditions exist.

Chromium-based anti-corrosive systems containing hexavalent chromium compounds have proven to be an extremely useful and versatile group of chemistries that are extensively used in aircraft metal treatment processes. They impart many beneficial and essential anti-corrosive characteristics to metallic substrates on which they are applied and have been used extensively for the pre-treatment of metals before coating, adhesive bonding and surface finishing.

Chemically, chromium-based anti-corrosive systems have involved the combination(s) of hexavalent chromium (e.g., $CrO_3$, $CrO_4^{2-}$, $Cr_2O_7^{2-}$) and hydrofluoric acid (HF) in the case of aluminum and its alloys. The hydrofluoric acid removes oxide film from the surface of the metallic substrate (e.g., aluminum) and the hexavalent chromium reacts with the exposed metal and a trivalent chromium oxide precipitates. Using aluminum as an example:

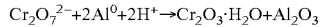

$$Cr_2O_7^{2-}+2Al^0+2H^+\rightarrow Cr_2O_3\cdot H_2O+Al_2O_3$$

Chromium oxide such as that produced according to the above reaction is quite useful in anti-corrosive applications. It is quite stable in alkaline environments, it is water repellant (hydrophobic) and may act as a barrier coating towards water. Finally, it exhibits a "self-healing effect"—that is, residual hexavalent chromium present in the coating may react with damaged areas of the coating—thereby producing more trivalent chromium oxide at damaged sites and therefore "healing" itself.

Consequently, chromium-based, and in particular hexavalent chromium-based systems have been extensively used in the aircraft industry because they have proven to be: highly effective at preventing corrosion and as an adhesion promoter for organic coatings and adhesives; particularly resilient as the application/treatment process exhibits a low sensitivity towards variation in process conditions; extremely effective on most/all aluminum alloys; and ensure considerable quality control characteristics as a skilled worker may tell the amount of chromium on the surface of a substrate by mere inspection (color) of the coating.

Concern about chromium—and in particular hexavalent chromium—in the environment has generated a need to replace chromium-based systems. Hexavalent chromium salts are classified as hazardous substances. The European Parliament has published directives requiring the elimination of hexavalent chromium such as directive 2002/95/EC for electrical and electronic equipment and directive 2000/53/EC for the automotive sector. Therefore "environmentally friendly", commercially acceptable alternative to chromium-based systems are highly desirable.

Prior art attempts to provide chromium-free coatings have met with limited success. For example, R. J. Racicot and S. C. Yang describe and compare the corrosion resistance performance of a polyaniline based conductive polymer coating versus a chromate conversion coating on two aluminum alloys in a paper entitled, "CORROSION PROTECTION COMPARISON OF A CHROMATE CONVERSION COATING TO A NOVEL CONDUCTIVE POLYMER COATING ON ALUMINUM ALLOYS", which was presented at CORROSION 97, paper 531, pp. 531/1-531/7, Houston, Tex., 1997. As disclosed by the authors, the double strand polyaniline exhibited limited corrosion protection for aluminum alloys AA2024-T3 and AA7075-T6 in salt-spray and salt and acid immersion tests.

The double strand polyaniline employed is a molecular complex of two polymers, polyaniline and a second polyanion. The two linear polymers are bonded non-covalently in a side-by-side fashion to form a stable molecular complex. As noted by the authors, the advantages to such double strand complexes is: 1) that the conductive state of the polymer is very stable; 2) with proper choice of the polymeric dopant, the conductive polymer may be dispersed in solvents and used as a coating material; and 3) the polymeric dopant provides sites for functionalization to achieve good adhesion to metal surfaces.

I. Paloumpa, A. Yfantis, P. Hoffmann, Y. Burkov, D. Yfantis and D. Schmeiber describe, in a paper entitled, "MECHANISMS TO INHIBIT CORROSION OF Al ALLOYS BY POLYMERIC CONVERSION COATINGS", which appeared in *Surface and Coatings Technology*, 180-181, pp. 308-312, 2004, describe a polypyrrole-based coating which can be formed on an aluminum surface from an aqueous polypyrrole (PPY) chemisorbed on titanium and zinc oxides and exhibits advanced corrosion resistance.

U.S. Pat. No. 5,342,456 to Dolan on Aug. 30, 1994, describes a "PROCESS FOR COATING METAL SURFACES TO PROTECT AGAINST CORROSION", wherein a chromium-free conversion coating can be formed on metals—particularly galvanized steel, by dry-in-place aqueous acidic liquids. The liquid comprises a component of anions, particularly at least four fluorine atoms and at least one atom from a group consisting of titanium, zirconium, hafnium, silicon, and boron and optionally, one or more oxygen atoms. Additional cations from the group consisting of cobalt, magnesium, manganese, zinc, nickel, tin, zirconium, iron, aluminum and copper, a sufficient free acid to give a pH in the range of 0.5 to 5.0 and optionally a compound that will form an organic resinous film upon drying in place.

A "CORROSION RESISTANT ALUMINUM ARTICLE COATED WITH EMERALDINE BASE POLYANILINE", was described in a U.S. Pat. No. 5,928,795 which issued to Spellane et al. on Jul. 27, 1999. The polyaniline used as the coating was a well-known emeraldine base form and is easily formed by the oxidative polymerization of aniline in excess hydrochloric acid by ammonium persulfate followed by treatment with ammonium hydroxide.

U.S. Pat. No. 5,980,723 which issued to Runge-Marchese et al. on Nov. 9, 1999, describes an "ELECTROCHEMICAL DEPOSITION OF A COMPOSITE POLYMER METAL OXIDE", which is a process for forming polymer films through electrochemical techniques utilizing electrolytes which include conductive polymer. The resulting polymer films described are electrically conductive and corrosion and wear resistant. Example polymer films included polyaminobenzene (polyaniline).

An aqueous liquid surface treatment composition having a pH value not more than 6.5 and containing phosphoric acid ions, condensed phosphoric acid ions, an oxidizing agent and a water-soluble polymer was described in U.S. Pat. No. 6,153,022 which issued to Yoshida on Nov. 28, 2000. The patentee therein reports that such coating rapidly forms on the surface of a metal, a conversion coating that has good corrosion resistance and adhesion to subsequently applied organic coatings such as paint and is less easily damaged by mechanical stresses than prior art conversion coatings.

"ELECTROACTIVE POLYMER COATINGS FOR CORROSION CONTROL" were described in U.S. Pat. No. 6,150,032, which issued to Yang et al. on Nov. 21, 2000. In that patent, the patentees describe an anti-corrosive polymeric complex which comprises a plurality of double-stranded molecular complexes including conductive polymer and a strand of a copolymer. The strands of the polymeric complex are non-covalently bonded to each other along the contour of the strands to form a side-by-side, twisted, double-stranded configuration.

U.S. Pat. No. 6,328,874, issued to Kinlen et al. on Dec. 11, 2001, for "ANODICALLY FORMED INTRINSICALLY CONDUCTIVE POLYMER-ALUMINUM OXIDE COMPOSITE AS A COATING ON ALUMINUM", describes a method for forming a coating On aluminum by contacting the aluminum with water, at least one multifunctional polymeric organic acid, a monomer of an intrinsically conductive polymer (ICP) and polymerizing the ICP monomer and forming aluminum oxide by imposing an electrical potential between the aluminum surface as an anode and a cathode. The intrinsically conductive polymer salt and aluminum oxide coating that is formed resists corrosion and is resistant to de-doping during immersion in hot water.

A "NONCHROMATE RUST PREVENTIVE AGENT FOR ALUMINUM, METHOD OF RUST PREVENTION AND RUST-PREVENTIVE ALUMINUM PRODUCTS" was described in U.S. Pat. No. 6,419,731, which issued to Inbe et al. on Jul. 16, 2002. The patentees therein describe a nonchromate rust preventive agent for aluminum that comprises a zirconium compound, a fluoride ion, a water soluble resin and an aluminum salt.

Sako et al., in U.S. Pat. No. 6,736,908 entitled, "COMPOSITION AND PROCESS FOR TREATING METAL SURFACES AND RESULTING ARTICLE", which issued on May 18, 2004, describe a metal treating composition comprising at least a specific type of dissolved and/or dispersed organic resin, a dissolved vanadium compound in which the valence of the vanadium is from 3 to 5, and a dissolved compound that contains at least one of the metals Zr (zirconium), Ti (titanium), Mo (molybdenum), W (tungsten), Mn (manganese), and Ce (cerium). According to the patentees, the treatment provides metal surfaces with superior corrosion resistance, alkali resistance, and fingerprint resistance. Advantageously, their composition contains no chromium.

U.S. Pat. No. 6,758,916 for "COMPOSITION AND PROCESS FOR TREATING METALS", issued to David McCormick on Jul. 6, 2004, describes a chromium-free conversion coating at least equivalent in corrosion protective quality to conventional chromate conversions that can be formed on metals, particularly cold rolled steel, by dry-in-place aqueous acidic liquid. The liquid has a pH value between 0.5 and 5.0 and comprises "fluorometallate" anions consisting of at least four fluorine atoms; at least one atom of an element selected from the group consisting of titanium, zirconium, hafnium, silicon, aluminum, and boron, and optionally, one or more of ionizable hydrogen atoms and oxygen atoms; a component of divalent or tetravalent cations of elements selected from the group consisting of cobalt, magnesium, manganese, zinc, nickel, tin, copper, zirconium, iron, and strontium—in very precise relative proportions.

Despite the developments of the prior art, the corrosion resistance imparted by non-chromate type treatments is invariably less than that provided by chromate type methods and agents and has not satisfied practical needs—particularly those in the aircraft industry(ies). The disclosure provides a chromium-free coating which, despite being chromium-free, is capable of providing corrosion protection equivalent to or superior than a chromium-type coating.

SUMMARY

In accordance with the principles of the disclosure—a chromium-free conversion coating for the treatment of metals—and in particular, aircraft metals—that provides superior corrosion resistance while not suffering from the environmental/toxicological infirmities of the chromium-based systems is provided. In addition, and in sharp contrast to chromium-free alternatives used in, for example, the automotive industries, the chromium-free conversion coating(s) provides the superior corrosion resistance characteristic(s) required by aircraft/aeronautical applications.

The coating is prepared by the addition of inorganic salts to dispersions of conducting polymers. Advantageously, the performance of the coating is comparable to that of known Cr (chromium)-based methods in a number of aluminum alloys having particular significance in the manufacture of aircraft.

In one of the embodiments of the disclosure, there is provided a process for treatment of metallic surfaces. The process comprises the steps of pretreating the metallic surfaces, coating the metallic surfaces with a conversion coating by contacting the metallic surfaces with a conducting polymer dispersion containing inorganic metallic salts selected from at least one of molybdenum, magnesium, zirconium, titanium, vanadium, cerium, hafnium, silicon, aluminum, boron, cobalt and zinc in concentrations of the inorganic metallic salt between 2.0 grams/Liter and 20 grams/Liter and a pH value of between 1 and 6.0, and drying the metallic surfaces.

In another one of the embodiments of the disclosure, there is provided a conversion coating for the treatment of metallic surfaces. The conversion coating comprises a conducting polymer dispersion containing an inorganic metallic salt of at least one of molybdenum, magnesium, zirconium, titanium, vanadium, cerium, hafnium, silicon, aluminum, boron, cobalt and zinc, wherein the concentration of the inorganic metallic salt is between 2.0 grams/Liter and 20 grams/Liter and the pH of the coating is between 1 and 6.0.

In another one of the embodiments of the disclosure, there is provided a process for treatment of metallic surfaces on aircraft. The process comprises the step of pretreating the metallic surfaces, wherein the pretreating comprises the steps of degreasing the metallic surfaces, cleaning the metallic surfaces, and deoxidizing the metallic surfaces. The process further comprises the step of coating the metallic surfaces with a conversion coating by contacting the metallic surfaces with a conducting polymer dispersion containing inorganic metallic salts selected from at least one of molybdenum, magnesium, zirconium, titanium, vanadium, cerium, hafnium, silicon, aluminum, boron, cobalt and zinc in concentrations of the inorganic metallic salt between 2.0 grams/Liter and 20 grams/Liter and a pH value of between 1 and 6.0. The process further comprises the step of drying the metallic surfaces at substantially room temperature.

These and other features and advantages of the disclosure will become apparent with reference to the attached drawings and detailed description.

BRIEF DESCRIPTION OF THE DRAWINGS

A more complete understanding of the disclosure may be realized by reference to the accompanying drawings in which:

FIG. 2 is a table that shows the properties of several conducting polymers used in the disclosure according to data provided by suppliers of the polymers;

FIG. 3 is a table that shows the experimental conditions for PEDOT/Zr for both tested alloys according to the disclosure;

FIG. 4 is a table that shows the experimental conditions for PPY/Zr for both tested alloys according to the disclosure;

FIG. 5 is a table that shows the measured corrosion of alloys treated with PEDOT/Zr according to the disclosure; and FIG. 6 is a table that shows the measured corrosion of selected alloys treated with PPY/Zr according to the disclosure.

DETAILED DESCRIPTION

Figure 1:
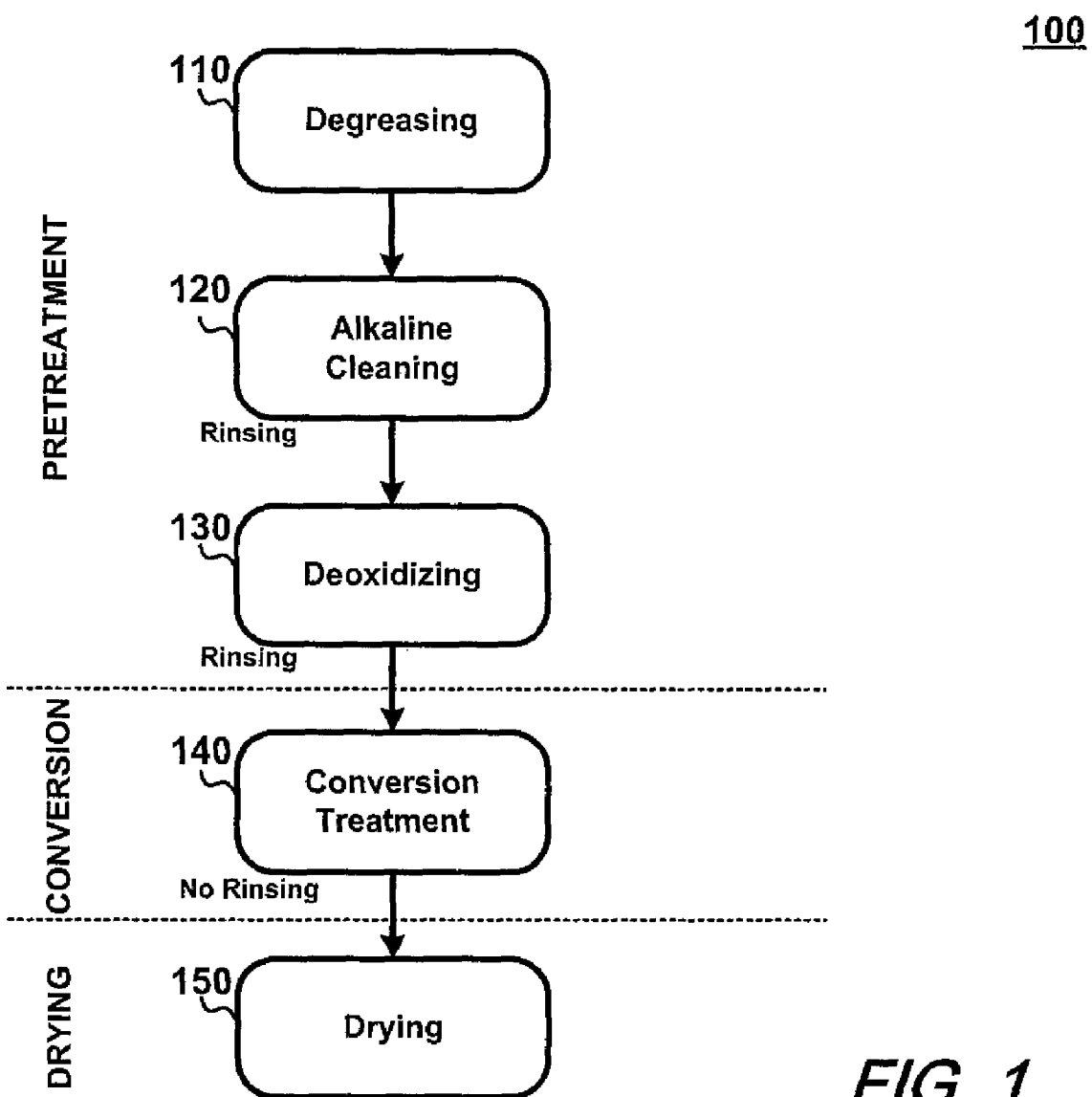
FIG. 1 is a process flow chart depicting the steps associated with the chromium-free conversion coating of the disclosure.

As can be appreciated by those skilled in the art, chemical conversion surface treatments/coatings generally involve the process of immersion or other contact of a metal (e.g., aluminum and/or alloys of aluminum) with an active bath or spray that—through a redox reaction at the metallic surface or chemical deposition at the metallic surface due to physicochemical changes in the treatment bath—form a superficial adhered protective coating. Such conversion coatings typically exhibit quite low solubility and—in the case of aluminum—a thickness of approximately 20 nm (nanometer) to 1 mm (millimeter), depending upon the process parameters and the alloy treated, while the substrate thickness lost is quite small or minimal. The color of the resulting conversion coating obtained depends upon the base material and the bath/spray parameters.

Advantageously, the conversion coating may be prepared in a single-step immersion process. Accordingly, parts, e.g., panels, to be coated are bathed in a conducting polymer dispersion in which different inorganic salts along with other additives that affect the bath and/or resulting coating, e.g., bath dispersion agents, wetting agents, or polymeric film formation agents.

FIG. 1 depicts an overview of the steps involved in the process. More particularly, the process includes three general phases or steps namely, pretreatment, conversion, and drying. And while the discussion herein is concerned primarily with aluminum and certain specific alloys of aluminum, the disclosure is not so limited. In particular, different metal compositions and alloys, as well as additional applications, e.g., automotive, industrial, etc., would benefit from the process or method and resulting coating as well.

Returning now to FIG. 1, it may be observed that pretreatment begins with step 110 of degreasing the panels to be coated. Degreasing may be performed using any of a variety of known detergent solutions and/or organic solvents. Additionally, such degreasing—like all of the process steps—may be performed by spray application or bath/immersion or a mixture of the two techniques.

Once the panel(s) to be coated is degreased, it is then cleaned/washed with an alkali solution with step 120 of alkaline cleaning. Such alkali solutions are commercially available under various trade names, e.g., TURCO (4215 NCLT), and this alkali cleaning/washing is advantageously performed for approximately 10 (ten) minutes at a modest elevated temperature, e.g., 50° C. (Celsius). After cleaning/washing, the panel is rinsed with water and then deoxidized with step 130 of deoxidizing, with, for example, TURCO Smut Go NC for approximately 5 (five) minutes at ambient temperature(s) and then rinsed. Advantageously, other pickling or desmutting steps can be used depending on the treated substrate material and surface material or thickness to be removed.

As can be now appreciated, the process employs commercially available pretreatment steps which are well known and understood. Advantageously, such pretreatment is compatible with a variety of alloys and their application is widely understood.

In an exemplary embodiment, step 140 of conversion treatment includes immersion of aluminum alloy panels in a bath for a period of time followed by direct (no rinse) step 150 of drying of the treated panels. Generally, the conversion treatment bath is prepared by an initial stirring of a conducting, polymeric dispersion. Advantageously, the polymer dispersion(s) used may be commercially available water-based ones and exhibit satisfactory formulation(s) including solid content, pH, and dispersive additives. Consequently, only a minimal amount of stirring is required for these commercial dispersions. Of further advantage, the conversion treatment in the bath is only a 2 (two) minute process.

Such conducting polymeric dispersions include polyaniline (PANI), polyethylenedioxythiophene (PEDOT) and polypyrrole (PPY) among others. The particular conducting polymeric dispersions used in the examples and their physical properties are shown in FIG. 2 which illustrates a table. While the discussion herein is limited to those conducting polymeric dispersions exhibiting superior performance in the experiments, it should be noted that a number of dispersions may be suitable—depending upon the particular application requirements. More specifically, dispersions of polyphenylene, polyphenylene vinylene, polyethylenesulfide and derivatives of all the mentioned conducting polymers should produce satisfactory results.

In addition, other polymeric components such as acrylics, polyurethanes, epoxies, amino resins, phenolics, vinylics, polyesters, etc., may be added to enhance particular characteristics of the coating.

Returning now to the description of the method, after stirring the conducting polymeric dispersion (and any polymeric components), a quantity of inorganic salt(s) or mixtures thereof are added to the conducting polymeric dispersion and subsequently mixed until the added salts are suitably dissolved. Example salts include the inorganic salts of molybdenum, manganesum, zirconium and titanium. More particularly, sodium molybdate, potassium permanganate, potassium hexafluorozirconate and potassium hexafluorotitanate have been used with success. Final concentrations of the added salts in the bath solution(s) may vary over a wide range, e.g., 2 g/L (grams/Liter)-20 g/L (grams/Liter).

Finally, the polymeric dispersion/inorganic salt solution is subsequently pH adjusted using alkaline compounds such as ammonia or phosphate or acidic compounds including hexafluorozirconic acid and fluorhydric acid.

EXAMPLES

A number of samples of two particular aluminum alloys, namely 2024T3 and 7075T6 alloys were subjected to the chromium-free conversion process and evaluated. Those showing superior characteristics in salt spray fog corrosion tests (SSFCT) were obtained using PPY and PEDOT in combination with hexafluorozirconate. The particular experimental conditions are shown in the tables of FIGS. 3 and 4 for PEDOT/Zr, PPY/Zr, based compositions and the tables of FIGS. 5 and 6 show the obtained results, respectively. For all of the samples shown in these tables of FIGS. 3-6, the drying conditions were substantially room temperature and pressure, for a period of time of at least 24 hours.

More specifically, the table of FIG. 3 shows the experimental conditions for PEDOT/Zr. In this set, the [Zr] (zirconium) concentration was effected by varying the amounts of $K_2ZrF_6$ (potassium hexafluorozirconate) and the pH was adjusted with $H_2ZrF_6$ (fluorozirconic acid) and/or $NH_4OH$ (ammonium hydroxide).

The table of FIG. 4 shows the experimental conditions used for a PPY/Zr set of samples. In this particular set, the [Zr] (zirconium) concentration was effected by varying the amounts of $K_2ZrF_6$ (potassium hexafluorozirconate) and the pH was adjusted with $H_2ZrF_6$ (fluorozirconic acid) and/or $NH_4OH$ (ammonium hydroxide).

Turning now to the table of FIG. 5, there it shows the corrosion resistance for the PEDOT/Zr conversion coating on both 2024-T3 and 7075-T6 aluminum alloys. The results obtained were after 168 hours of salt spray fog corrosion testing (SSFCT) and the hexavalent chromium based commercial ALODINE 1200S exhibited the best corrosion performance, with a corrosion score of 10.0. The corrosion score values go from 0 (zero) for the worst corrosion performance to 10 (ten) for best corrosion performance.

Similarly, the table of FIG. 6 shows the corrosion resistance for the PPY/Zr coating on the 2024-T3 and 7075-T6 alloys as well as the ALODINE 1200S treated alloys.

At this point, it should be noted that in addition to the Zr (zirconium) salts used in these exemplary tests, other salts— either alone or in combination—may produce satisfactory results as well. In particular, salts of vanadium, cerium, hafnium, silicon, aluminum, boron, cobalt, magnesium, and zinc may be employed. Additionally, other bath components such as pH adjusting compounds, solvents, non-aqueous dispersion media, silanes, dispersing agents, surfactants and coalescing solvents may be used to provide various degrees of coating effectiveness. Further, while the method and resulting coating(s) have been described in the context of immersion bath(s), it is understood that alternative coating, e.g., spray coating, may be used as well. Lastly, other metallic substrates, such as steel, aluminum, copper, and/or iron and/or their alloys, will benefit from the process or method and coating(s).

While the disclosure discusses and describes herein some specific examples, those skilled in the art will recognize that the teachings are not so limited. More specifically, it is understood that the method and coating may be used in virtually any application requiring corrosion protection, and in particular, those applications concerned with the problems associated with hexavalent chromium. Accordingly, it is understood that the process or method and coating may be applicable to any automotive, marine, construction, industrial, or household use in addition to aeronautical applications and therefore should be only limited by the scope of the claims attached hereto.

What is claimed is:

1. A process for treatment of metallic surfaces, the process comprising the steps of:
   pretreating the metallic surfaces;
   coating the metallic surfaces with a conversion coating by contacting the metallic surfaces with a conducting polymer dispersion consisting of a conducting polymer selected from the group consisting of polyaniline (PANI), polyethylenedioxythiophene (PEDOT) and polypyrrole (PPY) and inorganic metallic salts selected from at least one of molybdenum, magnesium, zirconium, titanium, vanadium, cerium, hafnium, silicon, aluminum, boron, cobalt and zinc in concentrations of the inorganic metallic salts between 2.0 grams/Liter and 20 grams/Liter and a pH value of between 1 and 6.0; and,
   drying the metallic surfaces.

2. The process of claim 1 wherein the coating step is applied to the metallic surfaces by spraying, or immersion.

3. The process of claim 2 wherein the coating step is immersion and is conducted in a treatment bath.

4. The process of claim 1 wherein the drying step is performed at room temperature.

5. The process of claim 1 wherein the pretreating step further comprises the steps of:
   degreasing the metallic surfaces;
   cleaning the metallic surfaces; and,
   deoxidizing the metallic surfaces.

6. The process of claim 5 further comprising the steps of:
   rinsing the metallic surfaces after the cleaning step;
   rinsing the metallic surfaces after the deoxidizing step; and,
   not rinsing the metallic surfaces after the coating step.

7. The process of claim 1 wherein at least one of the inorganic metallic salts is a salt of zirconium, the concentration of the at least one inorganic metallic salt of zirconium being produced with $K_2ZrF_6$ (potassium hexafluorozirconate) and the pH being adjusted with $H_2ZrF_6$ (fluorozirconic acid) and/or $NH_4OH$ (ammonium hydroxide).

8. The process of claim 1 wherein the metallic surfaces are ones selected from the group consisting of aluminum, copper, iron, and alloys thereof.

9. The process of claim 8 wherein the aluminum and its alloys is one selected from the group consisting of 2024-T3 and 7075-T6.

10. The process of claim 1 wherein the inorganic metallic salts are in a concentration of between 2.0 grams/Liter and 8.0 grams/Liter.

11. The process of claim 1 wherein the coating step is carried out at a pH of between 2 and 5.

12. A process for treatment of metallic surfaces on aircraft, the process comprising the steps of:
    pretreating the metallic surfaces, wherein the pretreating comprises the steps of:
    degreasing the metallic surfaces;
    cleaning the metallic surfaces; and,
    deoxidizing the metallic surfaces;
    coating the metallic surfaces with a conversion coating by contacting the metallic surfaces with a conducting polymer dispersion consisting of a conducting polymer selected from the group consisting of polyaniline (PANI), polyethylenedioxythiophene (PEDOT) and polypyrrole (PPY) and inorganic metallic salts selected from at least one of molybdenum, magnesium, zirconium, titanium, vanadium, cerium, hafnium, silicon, aluminum, boron, cobalt and zinc in concentrations of the inorganic metallic salts between 2.0 grams/Liter and 20 grams/Liter and a pH value of between 1 and 6.0; and, drying the metallic surfaces at room temperature.

13. The process of claim 12 further comprising the steps of:
rinsing the metallic surfaces after the cleaning step;
rinsing the metallic surfaces after the deoxidizing step; and,
not rinsing the metallic surfaces after the coating step.

14. The process of claim 12 wherein the inorganic metallic salts are present in concentrations of between 2.0 grams/Liter and 8.0 grams/Liter.

15. The process of claim 12 wherein the coating step is carried out at a pH of between 2 and 5.

16. A conversion coating composition for treatment of metallic surfaces, the conversion coating composition consisting of a conducting polymer dispersion consisting of a conducting polymer selected from the group consisting of polyaniline (PANI), polyethylenedioxythiophene (PEDOT) and polypyrrole (PPY) and inorganic metallic salts of at least one of molybdenum, magnesium, zirconium, titanium, vanadium, cerium, hafnium, silicon, aluminum, boron, cobalt and zinc, wherein the concentrations of the inorganic metallic salts are each between 2.0 grams/Liter and 20 grams/Liter and the pH of the conversion coating composition is between 1 and 6.0.

17. The conversion coating composition of claim 16 wherein the concentrations of the inorganic metallic salts are each between 2.0 grams/Liter to and 8.0 grams/Liter.

18. The conversion coating composition of claim 16 wherein the pH of the conversion coating composition is between 2 and 5.

* * * * *